(12) United States Patent
Tiberghien et al.

(10) Patent No.: US 7,731,243 B2
(45) Date of Patent: Jun. 8, 2010

(54) COUPLING ELEMENT FOR REMOVABLY JOINING PIPES

(75) Inventors: Alain-Christophe Tiberghien, Sevrier (FR); Christophe Durieux, Gilly sur Isere (FR); Serafim Marques Barroca, Frontenex (FR)

(73) Assignee: Staubli Faverges, Faverges (FR)

( * ) Notice: Subject to any disclaimer, the term of this patent is extended or adjusted under 35 U.S.C. 154(b) by 207 days.

(21) Appl. No.: 11/802,765

(22) Filed: May 24, 2007

(65) Prior Publication Data

US 2007/0274772 A1  Nov. 29, 2007

(30) Foreign Application Priority Data

May 29, 2006  (FR) .................................. 06 04763

(51) Int. Cl.
*F16L 37/18* (2006.01)

(52) U.S. Cl. ...................................... 285/316; 285/402

(58) Field of Classification Search .................. 285/86, 285/402, 401, 396, 360, 361, 316; 137/614.03–614.05
See application file for complete search history.

(56) References Cited

U.S. PATENT DOCUMENTS

| | | | | |
|---|---|---|---|---|
| 2,032,196 A | * | 2/1936 | Blake | .......................... 285/396 |
| 2,076,918 A | * | 4/1937 | Robison | ...................... 285/396 |
| 3,470,524 A | * | 9/1969 | Culver | .......................... 285/361 |
| 5,056,560 A | * | 10/1991 | DeMartelaere | ......... 137/614.04 |
| 5,253,716 A | | 10/1993 | Mitchell | |
| 5,741,084 A | * | 4/1998 | Del Rio et al. | ............... 285/361 |
| 6,497,435 B1 | * | 12/2002 | Luft et al. | .................... 285/360 |

FOREIGN PATENT DOCUMENTS

| | | |
|---|---|---|
| EP | 1 164 327 A1 | 12/2001 |
| FR | 1 526 167 | 5/1968 |
| FR | 1 580 284 | 9/1969 |

* cited by examiner

*Primary Examiner*—Aaron M Dunwoody
(74) *Attorney, Agent, or Firm*—Dowell & Dowell PC

(57) ABSTRACT

A female coupling element includes two superposed coaxial rings, a locking ring and safety ring which are rotatably mounted about a body of the coupling element. The locking ring is axially immobilized with respect to the body while the safety ring is able to slide with respect to the locking ring and with the body. The locking ring (2) has at least one locking slot for receiving a projection of a second element inserted within the coupling element and a notch to lock the projection axially with respect to the coupling element, and the safety ring includes at least one safety slot having a notch which locks the projection circumferentially in the notch of the locking ring.

11 Claims, 5 Drawing Sheets

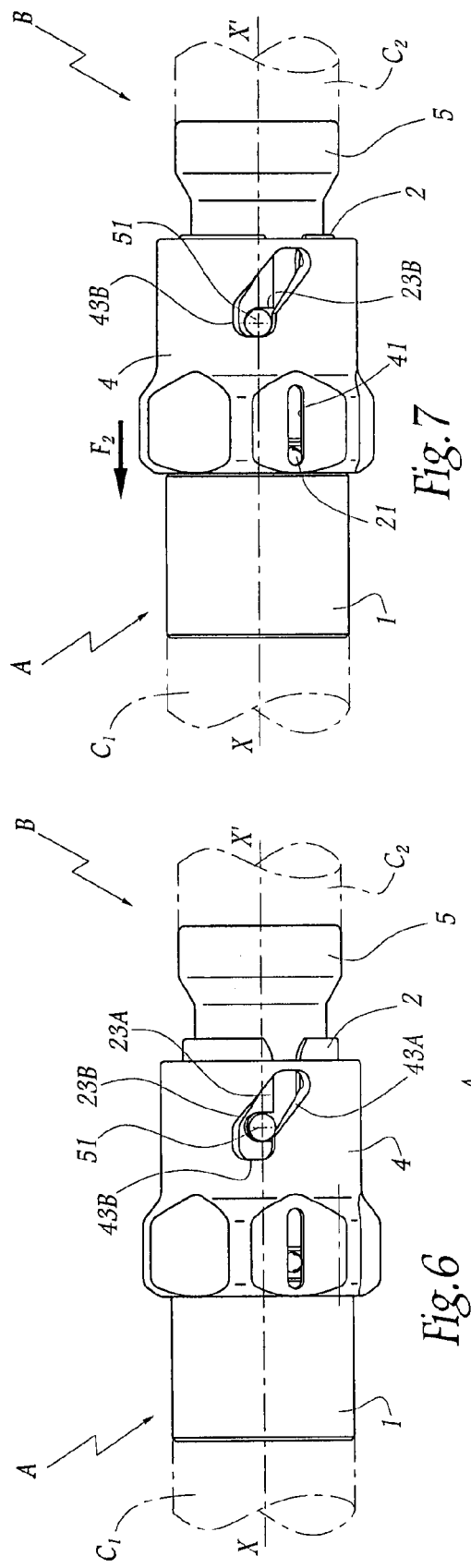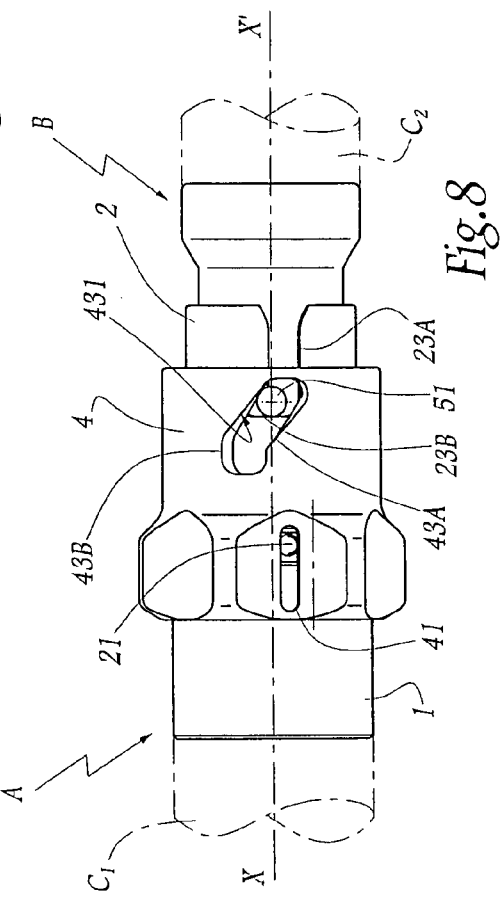

COUPLING ELEMENT FOR REMOVABLY JOINING PIPES

BACKGROUND OF THE INVENTION

1. Field of the Invention

The present invention relates to a coupling element and to a coupling intended for removably joining two pipes.

2. Brief Description of the Related Art

EP-A-1 164 327 teaches the connecting of two elements of a coupling using locking ramps with over-travel formed in a ring of a first element and intended to accept radially projecting lugs of the second element. The two elements of the coupling comprise shut-off valves associated with springs, which tend to push the elements apart. The locking is obtained by pushing the elements closer together against the action of the valve springs until an over-travel zone is reached in which the valve springs push the lugs of the second elements into notches. In this device, the lugs are locked exclusively by the valve springs. As a result, there is a risk that the elements will become disconnected if the pressure in the fluid circuits coupled drops and there is at the same time a relative rotation of the elements, for example under the effect of vibrations, tending to cause the two elements to move closer together and to drive the lugs into the over-travel zones of the locking ramps, in the unlocking direction.

FR-A-1 580 284 also teaches the coupling of male and female elements using a slit ring mounted with the possibility of rotating about a body of the female element. The slit ring comprises two juxtaposed series of slits, a first series of slits being intended to accept radially projecting tenons of the male element, while the second series of slits is intended to accept internal lugs of an outer ring that fits over the slit ring. The two series of slits are arranged in such a way that the slit ring is made to rotate about the body of the female element when the male and female elements are moved axially closer together. By rotating the slit ring it is possible simultaneously to lock the tenons of the male element in circumferential notches of the first series of slits and the internal lugs of the outer ring in inclined notches of the second series of slits. In this device, introducing the tenons of the male element into the first series of slits entails aligning these slits with axial slits in the body of the female element. Now, as the slit ring is mounted with freedom to rotate about the body of the female element, these slits are liable to become shifted relative to one another. They can be aligned by exerting a backward force on the outer ring beforehand, against the action of a spring. The locking of the male and female elements is therefore not automatic.

Elsewhere, U.S. Pat. No. 5,253,716 describes a female coupling element comprising two superposed rings including an inner ring welded to a body of the female element and an outer ring able to move axially with respect to the inner ring. The inner ring comprises slits for accommodating radially projecting lugs of a male element able to be pushed into the female element, each lug being designed to be secured in a slit of the inner ring by means of a corresponding semicircular slot in the outer ring. In this device, connecting the male and female elements entails moving the outer ring back with respect to the inner ring and rotating the male element with respect to the female element in order to cause the lugs of the male element to travel along the slits in the inner ring. A device such as this does not allow the coupling elements to be locked automatically in a single movement on the part of an operator.

BRIEF SUMMARY OF THE INVENTION

It is these disadvantages that the invention most specifically intends to overcome by proposing a coupling element able to have a second element pushed into it, these elements being able to be locked reliably one relative to the other, the locking in the connected position occurring automatically.

To this end, a subject of the invention is a coupling element intended for removably joining pipes, this element being able to have, pushed into it along its longitudinal axis, a second element, the first element comprising two superposed coaxial rings, namely a locking ring and a safety ring which are mounted around a body of the first element, means being able to block the locking ring axially with respect to the body while the safety ring is able to slide with respect to the locking ring and with respect to the body, the locking ring being equipped with at least one locking slot intended to accept a radially projecting part of a second element pushed into the first element, a notch of the locking slot being able to lock the radially projecting part axially with respect to the first element, the safety ring being equipped with at least one safety slot intended to accept the radially projecting part when it is accepted in the locking slot, a notch of the safety slot being able to lock the radially projecting part circumferentially with respect to the locking ring in the notch of the safety slot, characterized in that the locking ring and the safety ring are mounted with the possibility of rotating about the body of the element, means being able to cause the two rings to rotate as one.

According to other advantageous features of a coupling element according to the invention:
- the locking ring is the inner ring while the safety ring is the outer ring;
- the notch of the locking slot is directed substantially circumferentially with respect to the element while the notch of the safety slot is directed substantially axially with respect to the element;
- the means for causing the locking ring and the safety ring to rotate as one comprise at least one member projecting radially from the outer surface of the inner ring and able to be housed in an axial slit of the outer ring;
- the means for axially blocking the locking ring with respect to the body comprise at least one member projecting radially from the inner surface of the locking ring and able to be housed in an outer peripheral groove of the body;
- the locking slot comprises an entry portion directed substantially axially with respect to the element;
- the element comprises elastic return means which tend to position the safety ring with respect to the locking ring in such a way that the notch of the locking slot and the notch of the safety slot are substantially superposed;
- the safety slot comprises an entry portion, one edge of which is inclined from the notch of the safety slot towards the entry portion of the locking slot, this edge being intended to guide the radially projecting part of a second coupling element pushed into the first element out of the notch of the locking slot when the coupling elements are being disconnected;
- the safety slot comprises an entry portion, a second edge of which is inclined from the notch of the safety slot towards the entry portion of the locking slot, this second edge being intended to guide the radially projecting part of a second coupling element towards the notch of the locking slot when the coupling elements are being connected.

Another subject of the invention is a coupling for removably joining pipes, comprising a first element and a second element which are able to be pushed one into the other along a main axis of the coupling, the second element comprising at least one radially projecting part while the first element is as described hereinabove. Advantageously, the second element comprises at least two radially projecting parts, the first element comprising at least two corresponding locking slots and at least two corresponding safety slots.

BRIEF DESCRIPTION OF THE SEVERAL VIEWS OF THE DRAWINGS

The features and advantages of the invention will become apparent from the description which will follow of two embodiments of a coupling element and of a coupling according to the invention, which description is given purely by way of example and made with reference to the attached drawings in which:

FIG. 6 is a view similar to FIG. 1 during a third step in the coupling of the male and female elements;

FIG. 7 is a view similar to FIG. 1 when the coupling is in the locked configuration able to allow fluid to pass;

FIG. 8 is a view similar to FIG. 1 during a first step in the uncoupling of the male and female elements;

DETAILED DESCRIPTION OF THE INVENTION

Figure 1:
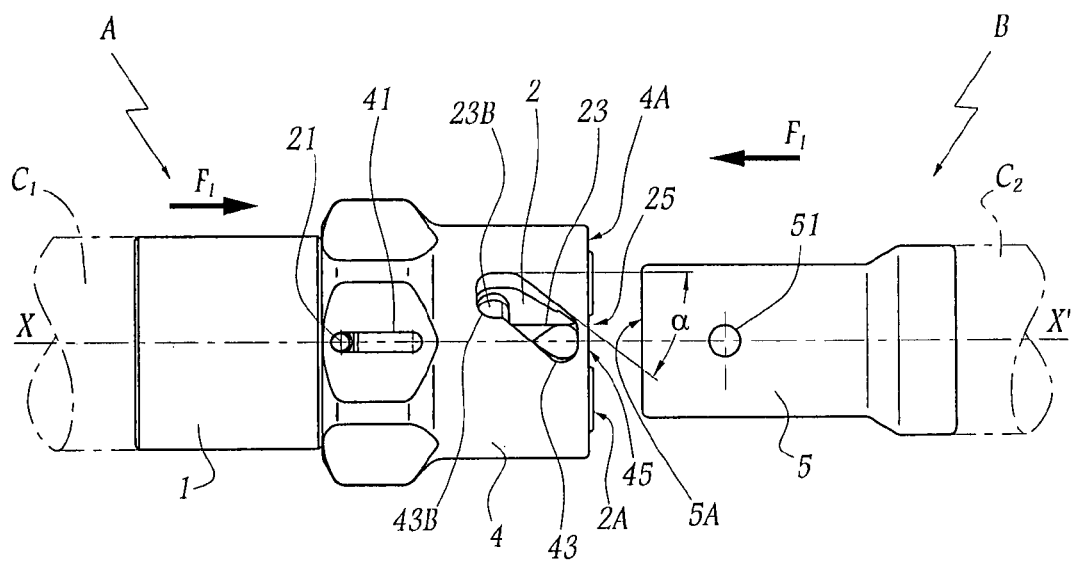
FIG. 1 is a side view of a coupling according to a first embodiment of the invention, before its male and female elements are coupled.
Figure 2:
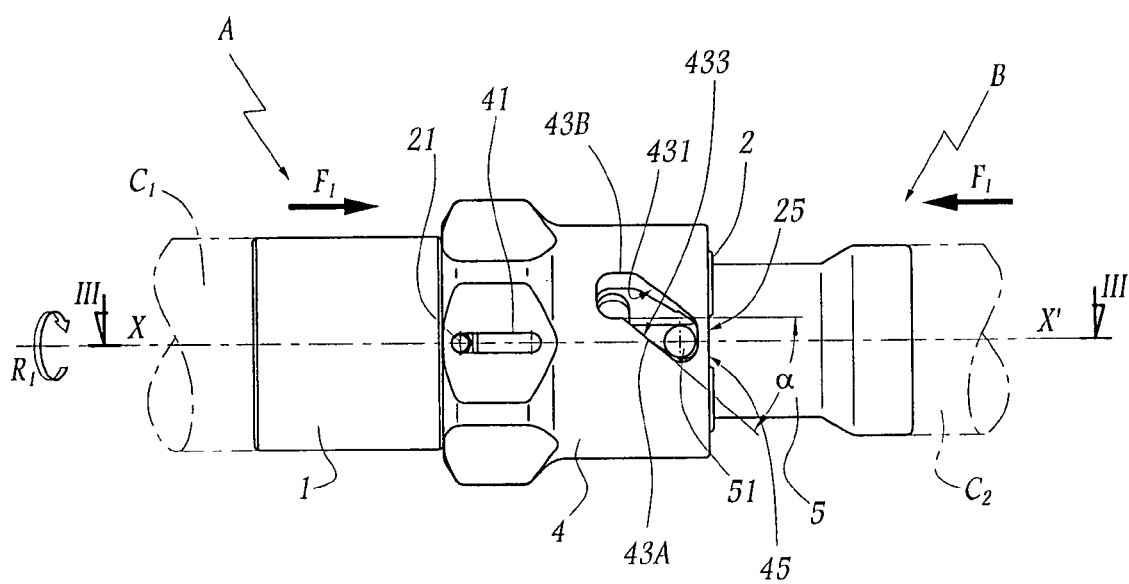
FIG. 2 is a view similar to FIG. 1 during a first step in the coupling of the male and female elements.

The coupling according to the first embodiment of the invention, depicted in FIGS. 1 to 8, comprises a female element A and a male element B, both of tubular overall shape and complementing one another. The rear part of the female element A is fluidically coupled to a first pipe $C_1$, while the rear part of the male element B is coupled to a second pipe $C_2$.

The main axis of the coupling formed by the elements A and B, that is to say the longitudinal axis of the elements A and B in the configurations they adopt in FIGS. 1 to 8, is denoted X-X'.

The female element A has a body 1 which is tubular overall and of circular cross section, around which are mounted two rings of circular cross section, these being coaxial and superposed, namely an inner locking ring 2 and an outer safety ring 4, centred on the axis X-X'.

The male element B comprises a body 5 which is tubular overall and of circular cross section and comprises, near its front end 5A, which is the opposite end to the pipe $C_2$, a pair of diametrically opposed lugs 51 which project radially outwards.

Figure 3:
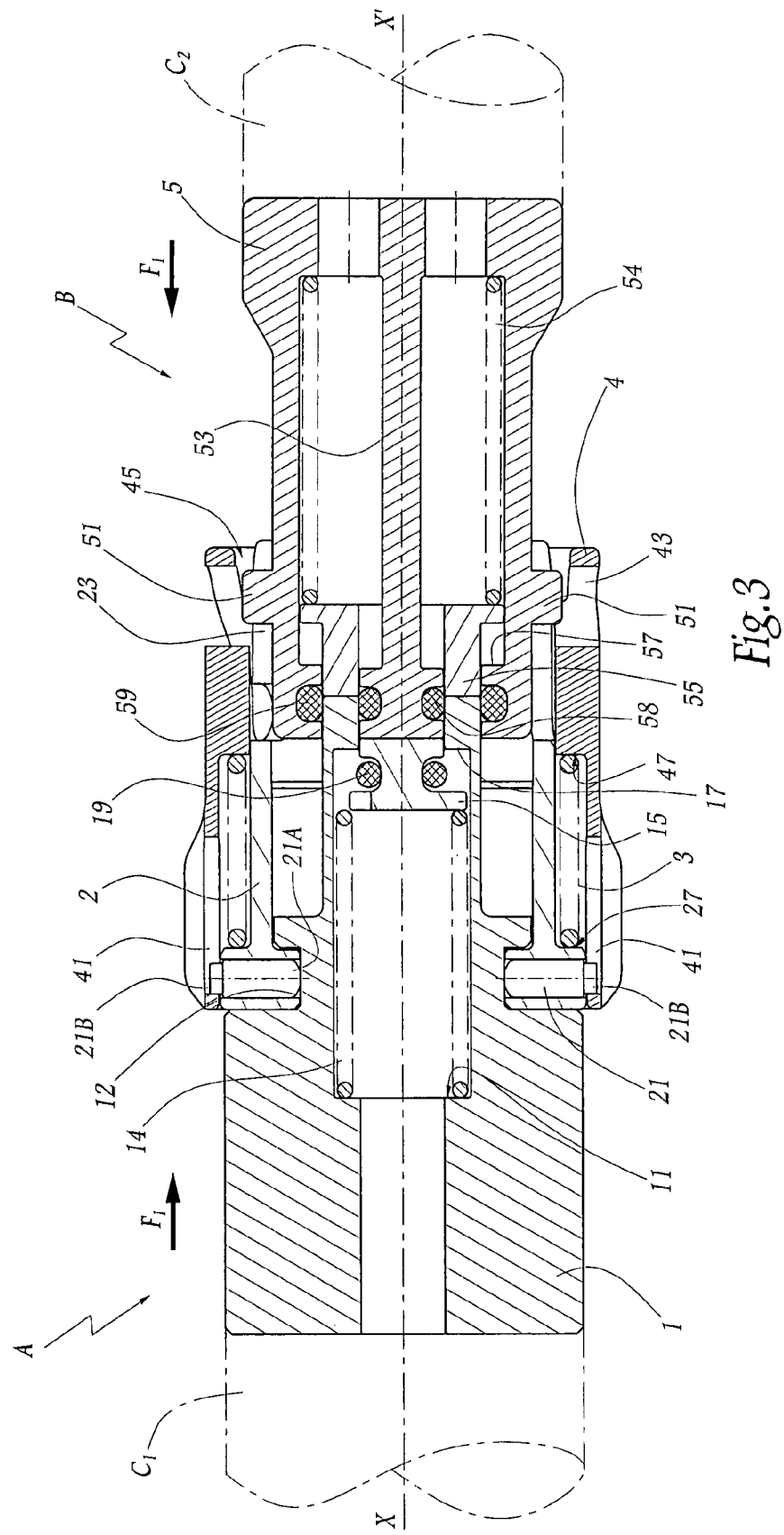
FIG. 3 is an axial section on a larger scale on the line III-III of FIG. 2.
Figure 4:
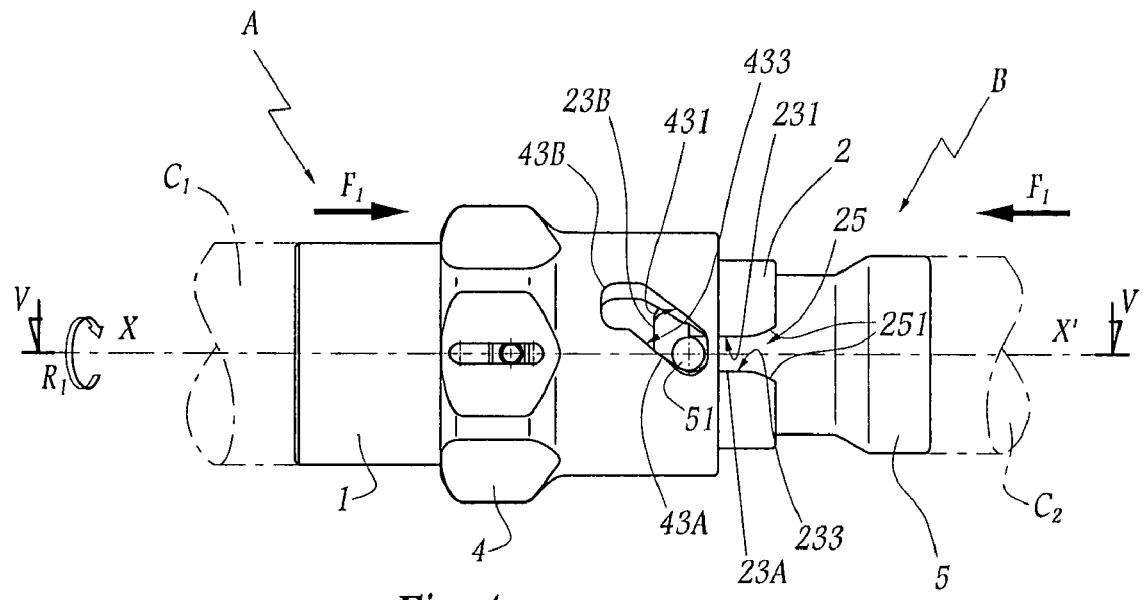
FIG. 4 is a view similar to FIG. 1 during a second step in the coupling of the male and female elements.
Figure 5:
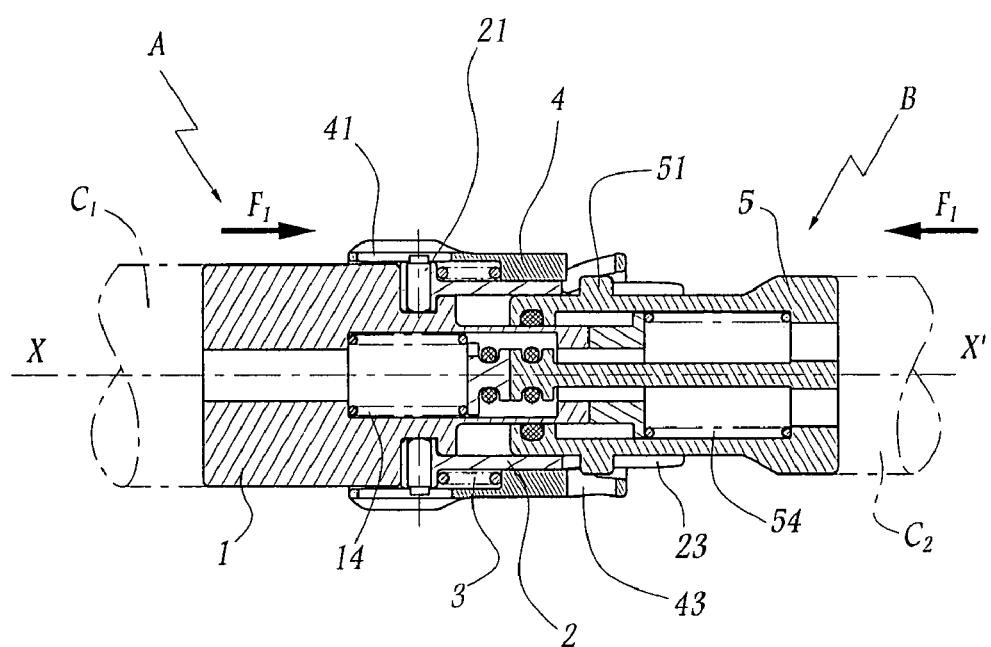
FIG. 5 is an axial section on the line V-V of FIG. 4.

As shown in FIG. 3, a pushrod 53 is designed to be mounted fixedly inside the body 5 centred on the axis X-X'. An annular valve shutter 55 is positioned around the pushrod 53 and elastically loaded by a spring 54 towards a seat 57 formed inside the body 5. There are two seals 58 and 59, one of them providing sealing between the valve shutter 55 and the pushrod 53 and the other providing sealing between the valve shutter 55 and the body 5.

The body 1 of the female element A defines an inner radial shoulder 11 against which a spring 14 can bear, this spring exerting an elastic force on a valve shutter 15 so as to press it onto a seat 17 formed in the body 1. A seal 19 mounted on the valve shutter 15 provides sealing between this valve shutter and the body 1.

The locking ring 2 and the safety ring 4 of the female element A are able to turn with respect to the axis X-X' about the body 1. The inner ring 2 is provided with two diametrically opposed pegs 21 which project radially with respect to the inner ring 2 both inwards and outwards. An inner end 21A of each peg 21 is intended to be in an outer peripheral groove 12 of the body 1. Thus, the inner locking ring 2 is axially blocked with respect to the body 1.

The pegs 21 are able to slide via their outer ends 21B in two diametrically opposed axial slits 41 formed in the outer safety ring 4. Because of the collaboration between the pegs 21 and the slits 41, the inner locking ring 2 and the outer safety ring 4 rotate as one about the body 1, the safety ring 4 being able to move in terms of axial sliding with respect to the locking ring 2 and with respect to the body 1.

The locking ring 2 comprises two diametrically opposed locking slots 23 intended to accept the lugs 51 of the male element B. Each slot 23 is open-ended and extends from an opening 25 formed at the front end 2A of the locking ring 2 which is the opposite end to the pipe $C_1$. Each opening 25 is provided with two lateral entry chamfers 251 designed to make it easier to couple the elements A and B by guiding the lugs 51. Each slot 23 comprises a substantially axial entry portion 23A and a substantially circumferential notch 23B, that is to say a notch directed in a direction that corresponds to a rotation about the axis X-X', which constitutes the opposite end of the locking slot 23 to the opening 25. The entry portion 23A is bounded by walls 231 and 233 which are substantially parallel to the axis X-X'.

The safety ring 4 comprises two diametrically opposed safety slots 43 intended to accept the lugs 51 of the male element B when they are housed in the locking slots 23 of the locking ring 2. For this purpose, the lugs 51 are designed to have a height such that they can engage both with the inner locking ring 2 at the locking slots 23 and partially with the thickness of the outer safety ring 4 at the safety slots 43. The fact that the lugs 51 do not penetrate the entire thickness of the safety ring 4 improves the mechanical integrity of this ring. This is because it becomes possible to provide material in the outermost thickness of each slot 43. In the embodiment described, each slot 43 is open, except at the front end 4A of the ring 4 which is the opposite end to the pipe $C_1$, where entry to the slot 43 is defined by a non-open inner end part 45 of the ring 4. As an alternative, each slot 43 could be not open over its entire length.

Each safety slot 43 comprises an entry portion 43A and a substantially axial notch 43B which constitutes the opposite end of the slot 43 to the end part 45. The entry portion 43A is inclined at an obtuse angle α with respect to the notch 43B and is defined by parallel walls 431 and 433.

A compression spring 3 is positioned between an outer radial shoulder 27 of the inner locking ring 2 and an inner radial shoulder 47 of the outer safety ring 4. The spring 3 exerts an elastic force on the safety ring 4 and pushes it away from the pipe $C_1$. The elastic force due to the spring 3 positions the safety ring 4 in such a way that each notch 23B of a locking slot is substantially superposed with a notch 43B of a safety slot, while each opening 25 of a locking slot is substantially superposed with an end part 45 of a safety slot. Thus, by virtue of the spring 3, there is no stable relative position of the rings 2 and 4 that does not allow the male element B to be pushed into the female element A.

When the male element B is to be pushed into the female element A, these elements are brought closer together as depicted by the arrows $F_1$, in FIGS. 1 to 5. Each lug 51 of the male element B is introduced simultaneously into the opening 25 of a locking slot 23 of the locking ring 2 and into an end part 45 of a safety slot 43 of the safety ring 4. Under the effect of the axial forces $F_1$, each lug 51 progresses axially in the entry portion 23A of the slot 23 until it comes elastically into abutment against the inclined edge 433 of the entry portion 43A of the slot 43. This inclined elastic abutment causes the safety ring 4, and therefore the locking ring 2, to rotate slightly in the direction of the arrow $R_1$ of FIG. 2, making it possible to compensate for any slack there might be between the lug 51 and the edge 231 of the portion 23A of the slot 23.

Under the action of the forces $F_1$ sustained by the elements A and B, the lug 51 continues to progress along the portion 23A, bearing against the edge 231, the safety ring 4 being moved axially with respect to the locking ring 2 against the action of the elastic force of the spring 3, because the lug 51 is butting against the edge 433 of the portion 43A near the end part 45.

When, in the entry portion 23A, the lug 51 comes to face the notch 23B in the locking slot 23, the locking ring 2 and the safety ring 4 are able to turn with respect to the axis X-X' about the body 1. This rotation takes place by virtue of the axial forces $F_1$ sustained by the elements A and B. Because of the inclination of the wall 433 of the slot 43 with respect to the axis X-X' of the coupling, abutment of the lug 51 against the wall 433 causes the safety ring 4, and therefore the locking ring 2, to move laterally and this causes them to turn about the body 1 in the direction of the arrow $R_1$ of FIG. 4. Thus, the notch 23B of the locking slot 23 comes to surround the lug 51 partially and locks its position axially as can be seen in FIG. 6.

When the locking ring 2 and safety ring 4 have finished rotating, each lug 51 lies, in the entry portion 43A, facing the notch 43B of the safety slot 43. As the notch 43B is substantially axial, the safety ring 4 is then able to slide with respect to the locking ring 2 and with respect to the body 1 under the elastic action of the spring 3. The notch 43B of the safety slot 43 thus comes to surround the lug 51 partially and locks its position circumferentially, that is to say in terms of rotation about the axis X-X', with respect to the notch 23B as can be seen in FIG. 7. When the coupling of the male B and female A elements is complete, each lug 51 is therefore in a locked position in the two notches 23B and 43B, the locking ring 2 impeding any axial movement of the lug 51 and one lateral movement of the lug 51 by virtue of the closed end of the notch 23B, while the safety ring 4 impedes the remaining lateral movement of the lug 51 out of the notch 23B.

As described hereinabove, the locking of the lugs 51 in the locking slots 23 and safety slots 43 is essentially axial and automatic. When the male element B and female element A are in the coupled configuration, these elements are able to pivot with respect to one another. Thus, the coupling does not introduce any stress in the event that the pipes become twisted.

The male element B and female element A of the coupling according to this first embodiment of the invention are uncoupled by exerting on the outer safety ring 4 an axial force towards the pipe $C_1$ against the action of the spring 3 as depicted by the arrow $F_2$ in FIG. 7. The inclined edge 431 of the entry portion 43A of the slot 43 then comes into abutment against the lug 51. The inclined edge 431 exerts a circumferential component of force on the lug 51 and this guides the lug 51 out of the notch 23B of the locking slot 23 as far as the entry portion 23A. When the lug 51 is in the entry portion 23A of the locking slot 23, the safety ring 4, released by the operator, is able to be moved away from the pipe $C_1$ under the action of the spring 3. Under the elastic action of the safety ring 4 and of the valve shutters 15 and 55, the lug 51 is pushed back towards the opening 25 until it is ejected from the locking ring 2. The male B and female A elements of the coupling are then disconnected. Optionally, an additional force may be exerted by an operator in order to disconnect the elements A and B.

Particularly advantageously, the edge 431 of the entry portion 43A of the safety slot 43 is inclined towards the entry portion 23A of the locking slot 23 and opens into the entry portion 23A irrespective of the relative axial position of the rings 2 and 4. Thus, when uncoupling the elements A and B, the edge 431 guides the circumferential movement of the lug 51 out of the notch 23B and guarantees that the lug 51 can actually reach the entry portion 23A before the operator releases the safety ring 4. Since the edge 431 guides the lug 51 out of the notch 23B, disconnection entails no further intervention on the part of the operator for moving the lug 51 circumferentially.

The disconnecting of the male B and female A elements of the coupling of the invention is therefore a disconnection in a single movement, this single movement corresponding to the axial moving of the safety ring 4 towards the pipe $C_1$. If the male element B is not fully locked in the female element A, that is to say if the lug 51 has not engaged in the notch 23B of the locking slot 23, the safety ring 4 and the elastically loaded valve shutters 15 and 55 push the lug 51 out of the locking slot 23 and disconnect the male and female elements. Thus, any intermediate position between the unlocked state and the locked state, or between the locked state and the unlocked state, is impossible.

By virtue of the twofold, axial and circumferential, locking of the lugs 51 in the notches 23B and 43B, any risk of the male and female elements becoming unlocked while in the connected position is eliminated.

When the male B and female A elements of the coupling according to the invention are being connected or disconnected, the highest forces, which correspond to the configurations in which the two elements are closest to one another, are provided by an operator rather than by the compression spring 3. This guarantees the reliability of the locking and of the unlocking of the lugs 51 with respect to the slots 23 and 43. In addition, because the edges 431 and 433 of the safety slots 43 are inclined, the forces supplied by the operator are very efficient, improving the ergonomics.

In the embodiment described, the inclined edges 431 and 433 of the slots 43 are mutually parallel. In a variant, not depicted, of the invention, the edges 431 and 433 can be non-parallel, each being inclined at an angle chosen for optimum ergonomics in the connecting and disconnecting of the elements A and B.

By virtue of the combination of locking slots 23 and safety slots 43, the axial over-travel of the coupling according to the invention corresponds to the operating tolerance. It is therefore minimal. Hence, the axial size of the parts that make up the male B and female A elements of the coupling can be small, as can the travel and size of the internals, such as the safety valves. The rotational over-travel of the coupling of the invention is also reduced, making it possible to reduce the extent to which the parts are weakened by the creation of the slots.

Figure 9:
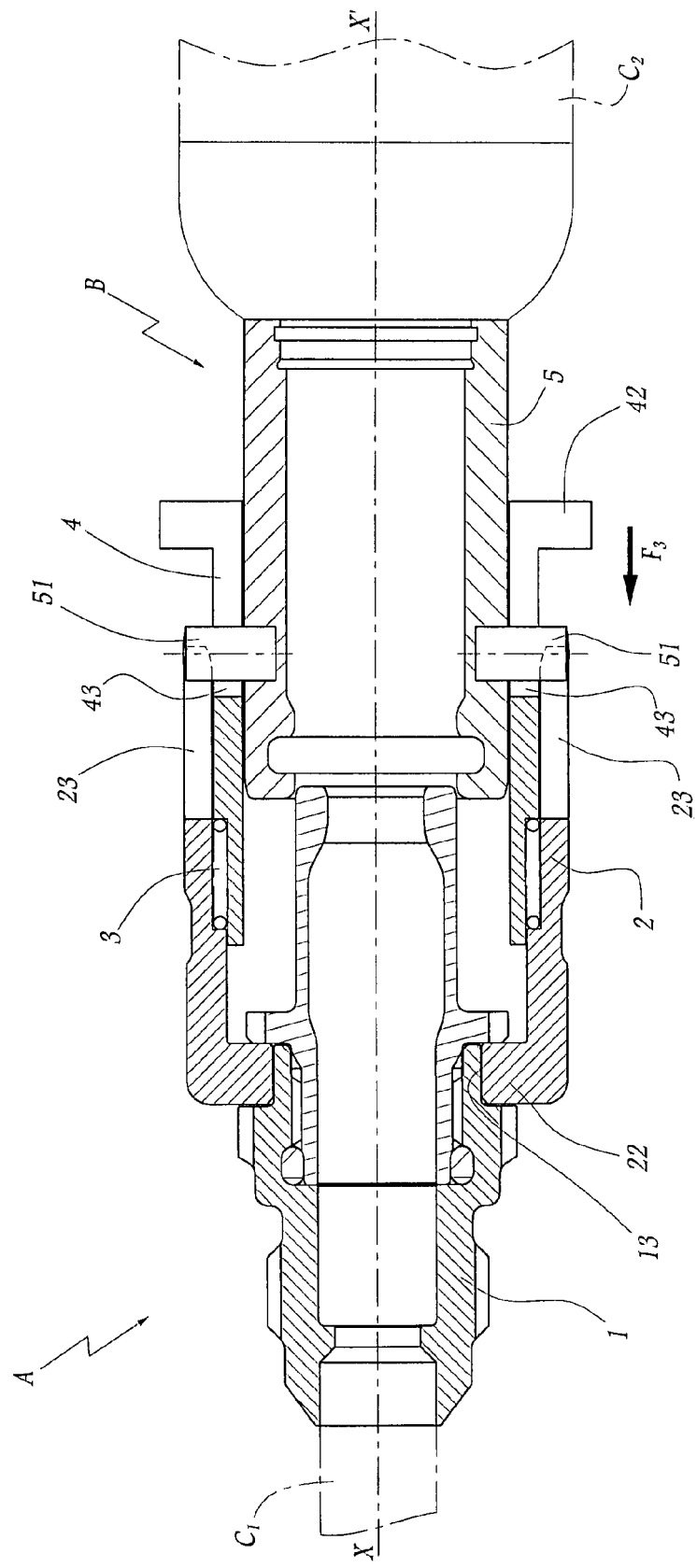
FIG. 9 is a section similar to FIG. 3 for a coupling according to a second embodiment of the invention, the internal valves of the coupling elements having been omitted.

In the second embodiment of the invention, depicted in FIG. 9, the female element A comprises, as in the first embodiment, a locking ring 2 and a safety ring 4 which are coaxial and mounted around the body 1. However, unlike in the first embodiment, the locking ring 2 here is the outer ring, while the safety ring 4 is the inner ring. The outer locking ring 2 comprises an internal peripheral flange 22 intended to be housed in an outer peripheral groove 13 of the body 1. Thus, the outer locking ring 2 is axially blocked with respect to the body 1. The locking ring 2 and safety ring 4 respectively comprise, as they did in the first embodiment, two locking slots 23 and two safety slots 43 able to accept the diametrically opposed lugs 51 of the male element B. As depicted in FIG. 9, the slots 23 and 43 are open-ended. As a variant, the locking slots 23 could be non open-ended.

The locking ring 2 and safety ring 4 are connected by two pins, not depicted, positioned substantially at right angles to axial slits, not depicted, analogous with the slits 41 of the first embodiment, formed in the locking ring 2 and safety ring 4. The rings 2 and 4 thus rotate as one about the body 1, the safety ring 4 being able to slide with respect to the locking ring 2 between the body 1 and the locking ring 2. A compression spring 3, housed between the inner safety ring 4 and the outer locking ring 2 exerts an elastic force on the safety ring 4 away from the pipe $C_1$ so as to substantially superpose firstly the notches of the slots 23 and 43 and secondly their openings and end parts.

The coupling of the male B and female A elements of the coupling according to this second embodiment is automatic, as it was in the first embodiment. The uncoupling of these elements is performed by exerting on the inner safety ring 4 an axial force directed towards the pipe $C_1$, against the action of the spring 3 as depicted by the arrow $F_3$ in FIG. 9. The inner ring 4 is accessible by virtue of an outer peripheral flange 42 which is slit to allow the passage of the lugs 51 and designed to project axially with respect to the outer ring 2, away from the pipe $C_1$. As in the first embodiment, the disconnecting of the elements A and B is a disconnection involving a single movement.

The invention is not restricted to the examples described and depicted. According to a variant, not depicted, of the invention, the lugs 51 may be formed in a female element, these lugs projecting radially towards the inside of the tubular female element. A complementary male element would comprise a locking ring and a safety ring both analogous to the rings 2 and 4 and mounted around a body of the male element. In this case, each slot of the outer ring would have to be open-ended, even at the front end of this ring, to allow the corresponding lug to pass. The slots in the inner ring would not need to be open-ended.

According to another undepicted variant of the invention, the number of lugs 51 may be higher than two, the lugs advantageously being uniformly distributed over the surface of the element equipped therewith. It may also be advantageous, when there are several lugs 51, to have these lugs not uniformly distributed, and likewise the corresponding locking slots 23 and safety slots 43. The coupling obtained would thus have polarizing means, contributing to making the coupling more safe.

Furthermore, each lug 51 may not form an integral part of the body 5 but be attached to this body and immobilized by any appropriate means. Each lug 51 could equally be provided with a flat so as to spread the contact loads resulting from the action of the valve springs, in the notch 23B of the corresponding locking slot. As an alternative, this notch 23B could be designed with an arc-shaped arrangement a few tenths of a millimeter deep so as to prevent hammering of the contact surfaces which occurs when a cylindrical lug 51 is mated with a flat-walled notch 23B.

Finally, in the embodiment described, the clearances there are between each lug 51 and the notch 23B of the corresponding locking slot are not compensated. As an alternative, these clearances could be compensated by the safety ring 4 in the axial and lateral directions using an appropriately rated spring. Circumferential, or lateral, locking of each lug 51 in the position in which the male and female elements are connected may also be provided exclusively by the safety ring 4, through suitable configuration of this ring. In this case, the locking ring 2 merely locks each lug 51 in the axial direction.

The invention claimed is:

1. A female coupling for removably joining pipes, the female coupling being adapted to receive a second coupling element inserted therein along a longitudinal axis of the female coupling, the female coupling comprising a first coupling element including a body and two superposed coaxial rings, a locking ring and a safety ring, which are mounted around a body, means to block the locking ring axially with respect to the body while the safety ring is able to slide with respect to the locking ring and the body, the locking ring including at least one locking slot of a size to receive a radial projection of a second coupling element when a second coupling element is inserted into the first coupling element, the at least one locking slot including a notch to lock the projection axially with respect to the body of the first coupling element, the safety ring having at least one safety slot that also receives a projection of a second coupling element when the projection is received in the locking slot, the at least one safety slot having a safety notch to lock the projection circumferentially with respect to the locking ring, the locking ring and the safety ring being rotatably mounted about the body of the first coupling element, and means for rotating the locking and safety rings as one.

2. The female coupling according to claim 1, wherein the locking ring is mounted inside the safety ring.

3. The female coupling according to claim 1, wherein the notch of the at least one locking slot is directed substantially circumferentially with respect to the body of first coupling element while the notch of the at least one safety slot is directed substantially axially with respect to the body of the first coupling element.

4. The female coupling according to claim 1, wherein the said means for rotating the locking ring and the safety ring as one includes at least one member projecting radially from an outer surface of an inner one of the two superposed coaxial rings which seats in an axial slit in an outer one of the two superposed coaxial rings.

5. The female coupling according to claim 1, wherein the means for axially blocking the locking ring with respect to the body includes at least one member projecting radially from an inner surface of the locking ring and is housed in an outer peripheral groove of the body.

6. The female coupling according to claim 1, wherein the at least one locking slot includes an entry portion directed substantially axially with respect to the body of the first coupling element.

7. The female coupling according to claim 1, including elastic return means mounted within the body which aligns the safety ring with respect to the locking ring in such a way that the locking notch of the at least one locking slot and the safety notch of the at least one safety slot are substantially superposed.

8. The female coupling according to claim 7, wherein the safety slot includes an entry portion, one edge of which is inclined from the notch of the at least one safety slot towards an entry portion of the at least one locking slot, the edge being provided for guiding a projection of a second coupling element that has been inserted into the first coupling element out of the notch of the at least one locking slot when the first and second coupling elements are being disconnected.

9. The female coupling according to claim 7, wherein the at least one safety slot includes an entry portion, a second edge of which is inclined from the safety notch of the at least one safety slot towards an entry portion of the locking slot, the second edge being intended to guide a projection of a second coupling element towards the locking notch of the at least one locking slot when the first and second coupling elements are being connected.

10. A coupling for removably joining pipes, comprising a first female coupling element and a second coupling element which are joinable one into the other along a main axis of the coupling, the second coupling element including at least one radial projection, the first coupling element including a body and two superposed coaxial rings, a locking ring and a safety ring, which are mounted around a body, means to block the locking ring axially with respect to the body while the safety ring is able to slide with respect to the locking ring and with respect to the body, the locking ring including at least one locking slot of a size to receive at least one radial projection of the second coupling element when the second coupling element is inserted into the first coupling element, the at least one locking slot including a notch to lock the at least one projection axially with respect to body of the first coupling element, the safety ring having at least one safety slot that also receives the at least one projection when the at least one projection is received in the at least one locking slot, the at least one safety slot having a safety notch to lock the at least one projection circumferentially with respect to the locking ring, the locking ring and the safety ring being rotatably mounted about the body of the first coupling element, and means for rotating the locking and safety rings as one.

11. The coupling according to claim 10, wherein the second element includes at least two radial projections, the first coupling element including at least two locking slots and at least two safety slots.

* * * * *